March 15, 1966  J. M. SCHUBERT  3,240,913
APPARATUS FOR CONTROLLING DEGREE OF PENETRATION
IN WELDING, ESPECIALLY OF TUBING
Filed Aug. 19, 1963                        2 Sheets-Sheet 1

INVENTOR.
JAMES M. SCHUBERT
By John W. Linkhauer
Agent

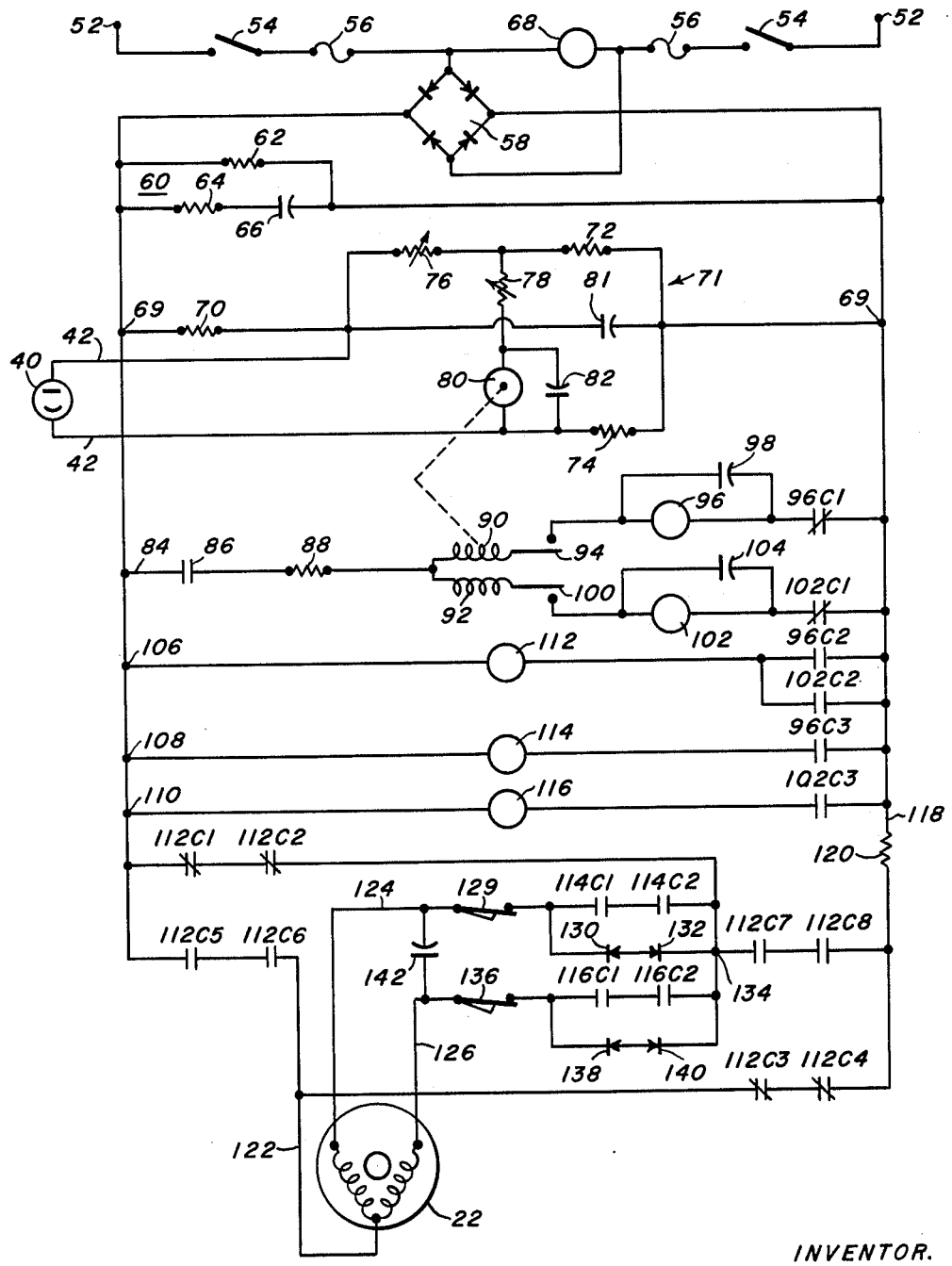

United States Patent Office 3,240,913
Patented Mar. 15, 1966

3,240,913
APPARATUS FOR CONTROLLING DEGREE OF PENETRATION IN WELDING, ESPECIALLY OF TUBING
James M. Schubert, East Troy, Wis., assignor to Crucible Steel Company of America, Pittsburgh, Pa., a corporation of New Jersey
Filed Aug. 19, 1963, Ser. No. 303,091
5 Claims. (Cl. 219—60)

This invention relates to the production of continuously welded products, and in particular, to the production of such products in which it is important that a weld which penetrates the metals to be joined to a uniform degree, despite variations in welding current, line voltage, metal thickness, line speed, and the like, be obtained. More particularly, the invention relates to apparatus for controlling the degree of weld penetration in the manufacture of pipe or tubing. In the specific embodiment herein disclosed, the invention relates to apparatus for controlling the degree of weld penetration in the manufacture of small-diameter (about ¼" to about 12" outside diameter) pipe or tubing by butt welding of shaped skelp, with the use of a welding electrode situated exteriorly of the shaped skelp, but as will be apparent to those skilled in the art, the concept of my invention is not limited to use with pipe or tubing of any specific size, or indeed, to pipe or tubing.

The degree of weld penetration has hitherto been controlled by manual means. Such control is disadvantageous because the quality of control is dependent upon the experience and attentiveness of the operator, and even with a skilled and attentive operator, owing to the rapidity with which it is desirable to operate the line and the poor indication of degree of weld penetration that is ordinarily available to guide the operator, production of a considerable quantity of low-quality material frequently cannot be avoided.

Accordingly, it is an object of the invention to provide apparatus operable by a relatively unskilled operator which will afford a welded product of uniform degree of weld penetration.

A still further object of the invention is the provision of apparatus whereby there may be produced a welded product wherein the degree of weld penetration is far more closely and accurately controlled than has hitherto been possible.

Although it has been appreciated for some time that, in the manufacture of continuously welded pipe or tubing, it is important that undue variation in the degree of weld penetration be avoided, the degree of weld penetration has hitherto been controlled only by manual means, owing to the particular difficulties which are confronted when an attempt is made to control by automatic means the degree of weld penetration in this application. These difficulties have included: (1) the design of a sensing head for determining the degree of weld penetration which would be sufficiently small to be inserted within the pipe and yet sufficiently rugged to withstand the conditions that it would encounter there in use, (2) the selection of sensing means responsive to radiation of such frequency as to yield an accurate indication of the degree of weld penetration, and (3) the positioning of the sensing means, in respect to the location of the welding head, in order to avoid the sensing of false indications of degree of weld penetration owing to imperfect abutting of the edges of shaped skelp being welded. Accordingly, further subsidiary objects of my invention comprise the provision of apparatus embodying features intended to overcome the above-mentioned difficulties in the welding of pipe or tubing.

In brief summary, the invention comprises, in its broadest aspect, means sensitive to visible light for determining the degree of weld penetration and emitting an electrical signal proportionate thereto, and means responsive to the above-mentioned sensing means for adjusting the rate at which energy is applied to the welding operation to maintain the sensed degree of weld penetration within desired limits or to return it to within desired limits if it has departed therefrom. For use of the invention in this broad aspect, as for example for the butt welding of flat plates or the welding of a rib to a plate, it will be essential to provide means for decreasing the amount of stray or background radiation incident upon the sensing means; when the invention is used for the welding of pipe or tubing, the pipe or tube itself provides such a means. In its more limited aspect, i.e., in an apparatus for controlling the degree of weld penetration in the manufacture of continuously welded tubing or pipe, the invention comprises the provision of such a sensing means with means for decreasing the amount of heat radiation incident upon the means for sensing visible radiation in combination with the location of the visible-light-sensing means entirely beyond the center line of the welding head, in order that the above-mentioned difficulties (2) and (3) may be avoided. Desirably, apparatus in accordance with the invention is provided with rapidly disconnectable and reconnectable electrical and other line fittings; this feature is particularly advantageous when the invention is applied to the continuous welding of pipe on a production-line basis, in order that in the event of wear or malfunctioning of the sensing head it may be replaced with a minimum loss of production.

A fuller understanding of the present invention may be obtained from the following detailed description of a preferred embodiment thereof and the appended drawings, in which:

FIGURE 6 is a circuit diagram for a preferred embodiment of a control system in accordance with the invention.

Figure 1:
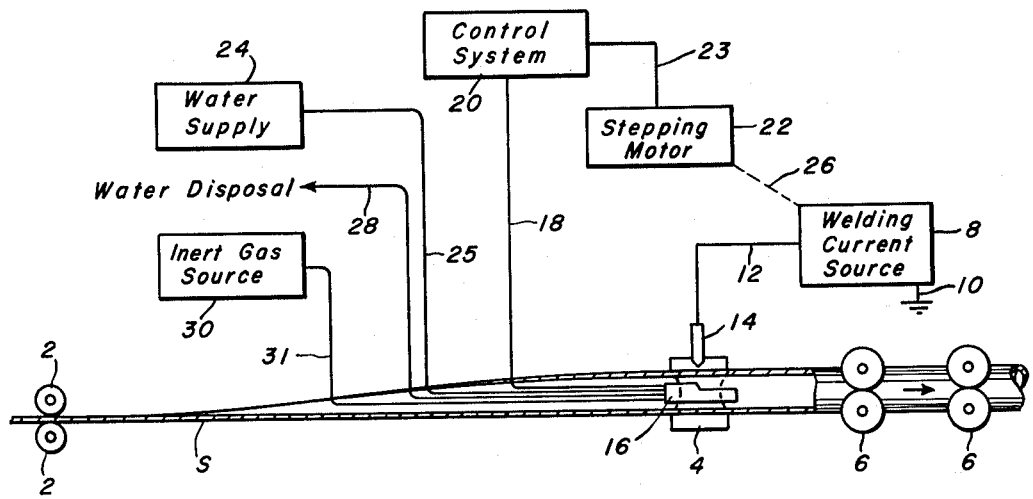
FIGURE 1 is a partially diagrammatic overall view of a continuous welding line provided with automatic means for controlling the degree of weld penetration in accordance with my invention.
Figure 2:
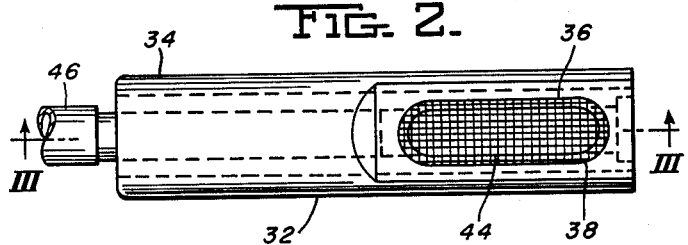
FIGURE 2 is a plan view of a sensing head for use in the apparatus of the present invention.
Figure 3:
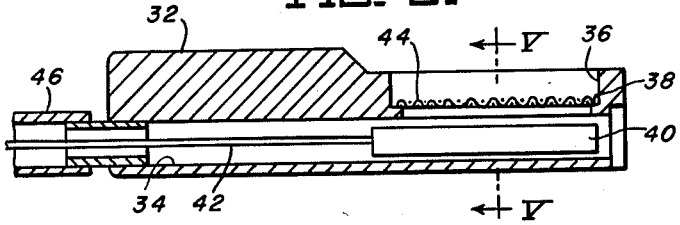
FIGURE 3 is an elevational view, in section, taken on the line III—III of FIGURE 2.
Figure 4:
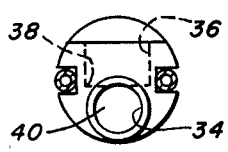
FIGURE 4 is an end view of the sensing head of FIGURE 2.
Figure 5:
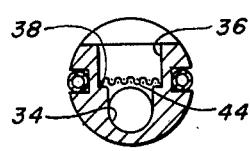
FIGURE 5 is an elevational section view taken on the line V—V of FIGURE 2.

As shown in FIGURE 1, a strip "S" of steel or other metal is passed in a continuous line, and preferably at a substantially uniform rate of speed, through pinch rolls 2 and is then bent around by conventional means (such as contoured rolls, not shown) to form an unwelded tube or pipe with a seam at its top or bottom, the pipe or tube then entering a welding station, whereat it is supported between contoured vertical shaft rolls 4. Upon leaving the welding station, the tube is supported and straightened between conventional horizontal shaft cup rolls 6 and is then cut into lengths by a conventional means, such as a flying saw. Current for welding is supplied by means of a welding-current source 8, which is connected to ground at 10 and includes a potentiometer or rheostat to control the amount of welding current. By means of a conductor 12, current is supplied through an electrode 14 to the seam in the pipe to be welded; a connection between the rolls 4 and ground completes the electrical circuit. The apparatus described above is conventional.

In accordance with the present invention, I provide, in combination with the above equipment, a sensing head 16 preferably so located that the photoelectric cell which it contains is beyond the center line of the welding station in the vicinity of the rolls 4, a conductor 18, a control system 20 which receives by means of conductor 18 the electrical signal produced by the photocell in the sensing head 16 proportionate to the degree of weld penetration sensed, a stepping motor 22, an electrical connection 23 by means of which the control system 20 operates the stepping motor 22, and a mechanical connection, indicated at 26, between the stepping motor 22 and the potentiometer or rheostat controlling the welding-current source 8. Preferably, I provide the sensing head 16 with water-cooling means, such as water supply 24, water-inlet line 25, and water-disposal line 28. I also provide the sensing head 16 with means for introducing inert gas thereinto, such as a source 30 of argon, helium, or other suitable gas, and line 31.

As best seen in FIGURES 2, 3, 4, and 5, the sensing head 16 comprises a body portion 32 having a longitudinally extending horizontal bore 34 therein for the passage of inert gas and an upwardly extending opening 36 at the end thereof remote from the end at which the inert gas is introduced, a flange or ledge 38, a photocell 40 positioned below the opening 36, leads 42 for conducting the electrical signal emitted by the photocell 40, and one or more fine screens 44 for protecting the photocell 40 from heat radiation incident thereon during service. A line 46, communicating with bore 34 and connected to head 16 by suitable means, such as silver solder, serves for the introduction of inert gas. Leads 42 extend within the line 46 to a suitable gland (not shown), through which they are extracted and led to the control system 20.

Body portion 32 of sensing head 16 may be made of any suitable material, such as steel. The photocell 40 may be any suitable design, such as a type NSL-34 cadmium sulfied photoconductive cell manufactured by National SemiConductors Ltd. of Montreal, Canada, and is desirably prepared for use by having leads attached to it and being potted in clear plastic to provide it with exterior dimensions approximating those of the bore 34, to prevent it from moving undesirably within the bore 34 during service. The screen or screens 44 may be made of phosphor-bronze wire, 0.0026 in. diameter, 150 x 150 per inch; other materials, such as steel, copper or brass may be used, or the screens may be replaced by other means that would admit light but retard the passage of heat, such as holes, slots, and the like. Preferably, one screen is used when relatively thin-walled tubing is being welded, and more than one screen is used when relatively heavy-walled tubing is being welded. The photocell 40 should be sensitive to visible light and relatively insensitive to infrared radiation; infrared radiation provides an indication of the temperature of the weld puddle, which remains relatively constant at about the melting point of the metal, whereas visible light increases proportionately with the size of the molten puddle and thus provides an indication of the magnitude of weld penetration.

The control system used with this embodiment of the invention may be understood by reference to FIGURE 6. A.C. power at 110 volts is supplied to the control system through switches 54, fuses 56, full-wave rectifier 58, and a filter 60 comprising a resistor 62 in parallel with another resistor 64 and a condenser 66. The coil of the time-delay relay 68 is inserted within the power-supply circuit, for a purpose to be hereinafter explained. The rectified and filtered power produced across the terminals 69 is applied through a fixed resistor 70 to a Wheatstone-bridge circuit, indicated generally at 71, comprising fixed resistors of equal value 72, 74, variable resistor 76, and a fourth leg consisting of photoelectric cell 40 and its leads 42. Across the neck of the Wheatstone bridge are connected, in series, a variable resistor 78 and a meter relay 80, with a damping condenser 82 being connected in parallel with a meter relay 80. A suitable meter relay is, for example, that described on page 13, catalog No. 4F, dated February 1959, of Assembly Products, Inc., Chesterland, Ohio, the model 461–C meter-relay. Connected in parallel with the two halves of the Wheatstone bridge formed by, on the one hand, variable resistor 76 and fixed resistor 72, and on the other hand, photocell 40 and fixed resistor 74, is a condenser 81. Connected in parallel with the power supply to the Wheatstone bridge is a circuit branch 84 comprising, in series, the contact 86 of the time-delay relay 68, a fixed resistor 88, and the locking coils 90 and 92 of the meter relay 80. Meter relay 80 is of the double-contact type, having one contact which enables energization of one of the coils, to wit, coil 90, whenever the detected degree of weld penetration is too low, and energization of the other of said coils, that is, coil 92, whenever the detected degree of weld penetration is too high. Connected in series are coil 90, contact 94, the coil of relay 96 and normally closed contact 96C1 of relay 96. Relay 96 has a normally closed contact 96C1 and two normally open contacts 96C2 and 96C3. A condenser 98 is connected in parallel to the coil of relay 96. Connected in series are coil 92, contact 100, the coil of a relay 102, and a normally closed contact 102C1 of the relay 102. Relay 102 has a normally closed contact 102C1 and two normally opened contacts 102C2 and 102C3. A condenser 104 is connected in parallel with the coil of relay 102.

Also connected in parallel with the above-mentioned branch 84 across the terminal 68 are three circuit branches 106, 108, and 110. Branch 106 consists of the coil of ratchet relay 112, in series with contacts 96C2 and 102C2, which are connected in parallel. Branch 108 consists of the coil of relay 114 in series with normally open contact 96C3. Branch 110 consists of relay 116 in series with normally open contact 102C3.

Ratchet relay 112 may, for example, be of the type AP170, described on page 11 of an undated brochure titled "Electromagnetic Relays" published by Potter and Brumfield, Inc. of Princeton, Indiana. Ratchet relay 112 has four normally closed contacts 112C1, 112C2, 112C3, and 112C4, as well as four normally open contacts 112C5, 112C6, 112C7, and 112C8.

Relays 114 and 116, as well as relays 96 and 102, may be of the type No. KRP11DG, also described on page 11 of the above-mentioned brochure. Relay 114 has two normally open contacts 114C1 and 114C2. Relay 116 has normally open contacts 116C1 and 116C2.

Also connected in parallel with the branches 84, 106, 108, and 110 across the terminals 68 is a final circuit branch 118 containing a voltage-reducing resistor 120 and arranged to provide current through leads 122, 124, and 126 to stepping motor 22, which is arranged to drive the potentiometer or rheostat of the welding-current source 8. The negative terminal 69 is connected to lead 122 through normally open contacts 112C5 and 112C6, which are arranged in series to provide increased contact life. Positive terminal 69 is connected to lead 122 through resistor 120 and normally closed contacts 112C3 and 112C4, these contacts being doubled for the same reason. Lead 124 is connected through limit switch 129 and the parallel combination of contact protectors 130, 132 and normally open contacts 114C1 and 114C2 to a terminal 134, which is connected to negative terminal 69 through two normally closed contacts 112C2 and 112C1 and to positive terminal 69 through two normally open contacts 112C7 and 112C8. Lead 126 is connected through limit switch 136 to a parallel combination of contact protectors 138 and 140 and normally open contacts 116C1 and 116C2 to terminal 134. A capacitor 142 is connected across leads 124 and 126.

Stepping motor 22 may be of the type described on page 58 of the 1963 catalog of the Cameradio Co., Penn Avenue, Pittsburgh 22, Pennsylvania, Cameradio catalog No. 27–SS150. This motor is of a special type, containing a permanent-magnet rotor having numerous teeth and a two-coil stator, so arranged that when direct current is alternately applied to one stator coil and then the other, there is obtained, by reason of the alternate magnetization of the individual teeth of the rotor, a fine stepping action, in the nature of 100 steps per revolution. The angular position of the shaft of stepping motor 22 is indicative of the desired welding current, and determines the actual welding current by reason of the direct mechanical connection with the potentiometer of welding-current source 8.

The above-described apparatus is operated in the following manner:

Switches 54 are closed. This energizes time-delay relay 68 and supplies power through rectifier 58, and thus creates a direct-current potential across the terminals 69. The potentiometer or rheostat within the welding-current source 8 is adjusted to provide a desired level of weld penetration. Then, using adjustable resistor 76, meter relay 80 is adjusted to midrange. Time-delay relay 68 does not operate immediately to energize the control circuit, but after a suitable delay, such as about one minute after switches 54 are closed, to permit the equipment to warm up and the operator to make necessary adjustments, automatic operation to control the level of weld penetration begins.

If the degree of penetration should become too low, unbalance is created in the Wheatstone-bridge circuit 71. That is, meter relay 80, for example, causes meter-relay locking coil 90 to close switch 94 and thus energize the coil of relay 96. This opens normally closed contact 96C1 and closes normally open contacts 96C2 and 96C3. The closing of contact 96C2 energizes the coil of relay 112, and the closing of contact 96C3 energizes the coil of relay 114. Energization of the coil of ratchet relay 112 causes opening of its normally closed contacts 112C1, 112C2, 112C3, 112C4 and closing of its normally opened contacts 112C5, 112C6, 112C7, 112C8. Energization of the coil of relay 114 causes closing of its normally opened contacts 114C1, 114C2. Thus, subject to the limitation upon increase of welding current imposed by limit switch 129, stepping motor 22 is driven in a direction to increase the welding current and thereby overcome the initial objection that the welding current was too low.

If, on the other hand, the degree of penetration becomes too high, so that automatic action to decrease the amount of welding current becomes desirable, the amount of radiation sensed by photocell 40 increases, causing unbalance in the other direction in the Wheatstone-bridge circuit 71 and consequent energization of meter-relay locking coil 92. Similarly, switch 100 is closed, energizing the coil of relay 102, to open normally closed relay 102C1 and close normally open relay contacts 102C2, 102C3. This energizes ratchet relay 112 and relay 116. Energization of ratchet relay 112 has the effect stated above, and energization of relay 116 closes normally open contacts 116C1, 116C2, closing a circuit to drive stepping motor 22 in the opposite direction, to increase the welding current and restore the desired degree of weld penetration.

When an unbalance in the bridge circuit 71 occurs, and meter relay 80 operates to energize, for example, relay 96, relay 96 is not activated immediately. Condenser 98, in parallel with the coil of relay 96, must be charged up to the pull-in voltage of relay 96. When the pull-in voltage is attained, the relay 96 is energized, and normally closed contact 96C1 opens. Relay 96 is not immediately de-energized, however, but remains energized until condenser 98 discharges to the dropout voltage of relay 96. The resistance of relay 96 and the size of condenser 98 are such as to yield a time cycle of about two or three seconds. The operation of relay 102 and its associated condenser 104 is essentially the same. The delay thus introduced is of a desirable magnitude, neither so short as to cause the control system to overcorrect or "hunt" nor so long as to make the control system undesirably sluggish and slow-acting.

The stepping motor 22 above described operates in such manner that to cause it to step continually in one direction, repeated pulses of alternating opposite polarity are required. It will be apparent to those skilled in the art that ratchet relay 112 and its contacts operate in such fashion as to continually alternate the polarity of pulses obtained through activation of relays 114 and 116, so that the stepping action of motor 22 is in the correct direction.

Although the present invention has been described with respect to certain specific embodiments, it will be readily apparent to those skilled in the art that various modifications therein may be made to suit specific requirements without departing from the spirit and scope of the invention.

I claim:

1. In apparatus for arc-welding objects to be joined having two opposite sides comprising means on one side of said objects for welding said objects, means for causing relative movement between said welding means and said objects, and control means operable to adjust the rate at which energy is supplied to said welding means, the combination therewith of means on the other of said sides of said objects for sensing visible light emitted from said other of said sides of said objects and emitting a signal proportionate to the intensity of said visible light and means responsive to said sensing and signal-emitting means for operating said control means to maintain the degree of weld penetration within preselected limits.

2. In apparatus for arc-welding pipe or tubing formed from shaped skelp comprising means exterior of said shaped skelp and adjacent to a seam therein for effecting welding along said seam, means for causing relative movement at a substantially uniform rate between said welding means and said skelp, and control means for adjusting the rate at which energy is supplied to said welding means, the combination therewith of means situated within said shaped skelp for sensing visible light emitted from the vicinity of said seam and emitting a signal proportionate to the quantity thereof sensed and means responsive to said sensing and signal-emitting means for operating said control means to maintain the degree of weld penetration within preselected limits.

3. An apparatus as defined in claim 2, characterized in that said sensing and signal-emitting means comprises a sensing head comprising a photocell, a member wherein said photocell is mounted, means for cooling said member, means situated between said photocell and a welded portion of said shaped skelp for diminishing the amount of radiation incident upon said photocell, and means for directing coolant gas over said photocell, through said radiation-diminishing means, and into impingement with said welded portion of said shaped skelp.

4. An apparatus as defined in claim 3, characterized in that said photocell is positioned entirely beyond the center line of the welding head.

5. An apparatus as defined in claim 3, characterized in that said photocell is positioned entirely beyond the center line of the welding head and in that said sensing head is provided with rapidly disconnectable and reconnectable fittings.

References Cited by the Examiner

UNITED STATES PATENTS 2,089,015  8/1937  Bucknam et al. _____ 113—59

RICHARD M. WOOD, *Primary Examiner.*